United States Patent
Ricketts

(10) Patent No.: US 10,470,373 B2
(45) Date of Patent: Nov. 12, 2019

(54) AGRICULTURAL VEHICLE WITH BELT UNLOADER

(71) Applicant: CNH Industrial America LLC, New Holland, PA (US)

(72) Inventor: Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/466,231

(22) Filed: Mar. 22, 2017

(65) Prior Publication Data
US 2018/0271022 A1    Sep. 27, 2018

(51) Int. Cl.
| | |
|---|---|
| A01D 90/10 | (2006.01) |
| A01D 41/06 | (2006.01) |
| A01D 61/02 | (2006.01) |
| A01F 7/06 | (2006.01) |
| A01F 12/44 | (2006.01) |
| A01F 12/46 | (2006.01) |
| A01D 41/12 | (2006.01) |
| B65G 15/08 | (2006.01) |

(52) U.S. Cl.
CPC .............. *A01D 90/10* (2013.01); *A01D 41/06* (2013.01); *A01D 41/1217* (2013.01); *A01D 61/02* (2013.01); *A01F 7/062* (2013.01); *A01F 12/446* (2013.01); *A01F 12/46* (2013.01); *B65G 15/08* (2013.01)

(58) Field of Classification Search
CPC .... A01D 41/1217; A01D 61/02; A01D 90/00; B65G 19/14; B65G 21/14; B65G 15/08; B65G 65/42; B65G 15/60; B65G 37/00; B65G 2201/0211; A01F 12/46

USPC .......................................................... 198/617
See application file for complete search history.

(56) References Cited

U.S. PATENT DOCUMENTS

| | | | | | |
|---|---|---|---|---|---|
| 2,505,982 | A | * | 5/1950 | Meissner | B63B 27/22 126/214 A |
| 3,024,893 | A | * | 3/1962 | Lambert | B65G 21/2081 198/836.1 |
| 3,326,354 | A | | 6/1967 | Aydelott | |
| 3,597,905 | A | * | 8/1971 | Jarrell | A01D 45/22 460/128 |
| 3,704,797 | A | * | 12/1972 | Suykens | B65D 90/582 222/502 |

(Continued)

FOREIGN PATENT DOCUMENTS

| | | | | |
|---|---|---|---|---|
| CA | 2229913 A1 | 8/1999 | | |
| CN | 2895332 Y | * 5/2007 | ............. | B65G 39/02 |

(Continued)

OTHER PUBLICATIONS

International Search Report and Written Opinion for PCT/US2018/023789 dated Mar. 22, 2018 (12 pages).

*Primary Examiner* — Arpad Fabian-Kovacs
(74) *Attorney, Agent, or Firm* — Peter K. Zacharias; Patrick M. Sheldrake

(57) ABSTRACT

An agricultural vehicle, includes a chassis; a cleaning system carried by the chassis including at least one sieve and configured to clean crop material; and an unloader carried by the chassis and supplied with cleaned crop material from the cleaning system. The unloader includes: a roller; a belt wrapped around the roller; and an oblong housing at least partially enclosing the belt.

18 Claims, 3 Drawing Sheets

(56) References Cited

U.S. PATENT DOCUMENTS

| | | | | |
|---|---|---|---|---|
| 3,722,743 | A * | 3/1973 | Atchley | B65G 1/127 198/801 |
| 3,791,053 | A * | 2/1974 | Breckbill | B30B 11/24 198/522 |
| 3,840,134 | A * | 10/1974 | Luscombe | A01D 85/004 100/210 |
| 3,863,783 | A * | 2/1975 | Spellman, Jr. | B28C 5/4255 198/311 |
| 3,945,484 | A * | 3/1976 | Oury | B65G 21/14 198/313 |
| RE29,110 | E * | 1/1977 | Oury | B65G 21/14 198/314 |
| 4,468,875 | A * | 9/1984 | Harrison | F41A 9/76 42/50 |
| 4,641,740 | A * | 2/1987 | Grecksch | B65H 67/068 198/483.1 |
| 4,760,913 | A | 8/1988 | Tschantz | |
| 5,203,442 | A * | 4/1993 | Oury | B28C 5/4255 198/313 |
| 5,307,917 | A * | 5/1994 | Hall | B65G 21/14 198/313 |
| 6,079,551 | A | 6/2000 | Horak | |
| 6,269,943 | B1 | 8/2001 | Mott | |
| 6,305,896 | B1 * | 10/2001 | Szentimery | B60P 1/36 198/605 |
| 6,745,701 | B2 * | 6/2004 | Elder | B65D 90/623 105/247 |
| 7,571,802 | B2 * | 8/2009 | Bowman | B65G 21/2081 198/836.1 |
| 7,874,899 | B2 * | 1/2011 | Mackin | A01D 41/127 460/114 |
| 8,051,988 | B2 * | 11/2011 | Farley | A01F 12/46 209/274 |
| 8,241,098 | B1 * | 8/2012 | Latimer | A01F 12/46 198/313 |
| 8,827,069 | B2 * | 9/2014 | Freehill | A01D 41/1217 198/595 |
| 9,315,327 | B2 * | 4/2016 | Priepke | B65G 19/14 |
| 9,334,124 | B2 * | 5/2016 | Teichrob | B62D 7/06 |
| 9,371,187 | B2 * | 6/2016 | Priepke | A01D 41/1217 |
| 2002/0139643 | A1 | 10/2002 | Peltier et al. | |
| 2011/0094199 | A1 * | 4/2011 | Farley | A01F 12/46 56/14.6 |
| 2012/0269607 | A1 * | 10/2012 | Farley | B65G 33/14 414/507 |
| 2012/0285795 | A1 * | 11/2012 | Dekoning | B65G 21/2081 198/311 |
| 2013/0087432 | A1 * | 4/2013 | Priepke | A01D 41/1217 198/716 |
| 2014/0216897 | A1 * | 8/2014 | Freehill | A01D 41/1217 198/594 |
| 2015/0027854 | A1 * | 1/2015 | Priepke | B65G 15/08 198/617 |
| 2015/0053535 | A1 | 2/2015 | Silva | |
| 2015/0132093 | A1 | 5/2015 | Biggerstaff et al. | |

FOREIGN PATENT DOCUMENTS

| | | | | |
|---|---|---|---|---|
| CN | 206156200 U | * | 5/2017 | B65G 15/16 |
| EP | 2311309 A1 | | 4/2011 | |
| EP | 2761983 A2 | | 8/2014 | |
| GB | 2121512 A | * | 12/1983 | B65G 39/02 |
| JP | 04189234 A | * | 7/1992 | B65H 5/02 |
| JP | 08026553 A | * | 1/1996 | B65H 27/00 |
| WO | 2005/085101 A1 | | 9/2005 | |

* cited by examiner

AGRICULTURAL VEHICLE WITH BELT UNLOADER

FIELD OF THE INVENTION

The present invention relates to agricultural vehicles, and, more particularly, to agricultural harvesters equipped with unloaders.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Typically, the unloading system of the combine incorporates an unloading auger which offloads the grain. One particular problem is that, compared to belt conveyors, augers generally require more power to convey the same amount of grain. However, belt conveyors are not typically incorporated in combine unloading systems for a variety of reasons.

One particular reason belt conveyors are not typically incorporated in unloading systems is due to the weight and complications caused by the construction of many belt conveyors. Belt conveyors typically incorporate a pair of rollers, with the belt wrapped around the rollers, supported by a frame. The frame can add a significant amount of weight to the system, which is problematic in a long unloading system that is cantilevered to the combine, and also tends to lead the design of the belt conveyor toward flat belts. In unloading applications, flat belts do not allow for conveyed material to reach the depths which are desired. There have been some developments in utilizing belt conveyors which curve the belt during rotation, but such systems have also required a frame supporting the rollers, leading to the aforementioned problems associated with frames.

What is needed in the art is a belt conveyor for an unloader of an agricultural vehicle which overcomes some of the previously described problems of known belt conveyors.

SUMMARY OF THE INVENTION

In accordance with an aspect of the present invention, there is provided a belt conveyor which has an oblong housing at least partially enclosing a belt wrapped around a roller.

In accordance with another aspect of the present invention, there is provided an agricultural vehicle, including: a chassis; a cleaning system carried by the chassis including at least one sieve and configured to clean crop material; and an unloader carried by the chassis and supplied with cleaned crop material from the cleaning system. The unloader includes: a roller; a belt wrapped around the roller; and an oblong housing at least partially enclosing the belt.

In accordance with yet another aspect of the present invention, there is provided a material conveyor including a roller; a belt wrapped around the roller; and an oblong housing at least partially enclosing the belt.

In accordance with yet another aspect of the present invention, there is provided an agricultural vehicle, including: a chassis; a cleaning system carried by the chassis including at least one sieve and configured to clean crop material; and an unloader carried by the chassis and supplied with cleaned crop material from the cleaning system. The unloader includes: a roller; a belt wrapped around the roller and defining a conveying side and a return side opposite the conveying side; and a housing at least partially enclosing the belt and having a first U-shaped surface which curves the conveying side of the belt during rotation of the roller and a second U-shaped surface which curves the return side of the belt during rotation of the roller.

An advantage of the agricultural vehicle and material conveyor described herein is that the housing can curve the belt on both a conveying and return side of the belt, allowing for the belt to be deeper during conveyance and the belt to clean itself on the return.

Another advantage of the agricultural vehicle and material conveyor described herein is that the shape of the oblong housing can provide a relatively strong construction without exceeding the weight restrictions of the unloader.

Yet another advantage of the agricultural vehicle and material conveyor described herein is that the self-cleaning ability of the belt can reduce or eliminate material accumulation on and/or in the belt, reducing grain loss in the system and the possibility of accumulated material adversely affecting operation of the belt.

BRIEF DESCRIPTION OF THE DRAWINGS

The above-mentioned and other features and advantages of this invention, and the manner of attaining them, will become more apparent and the invention will be better understood by reference to the following description of an exemplary embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
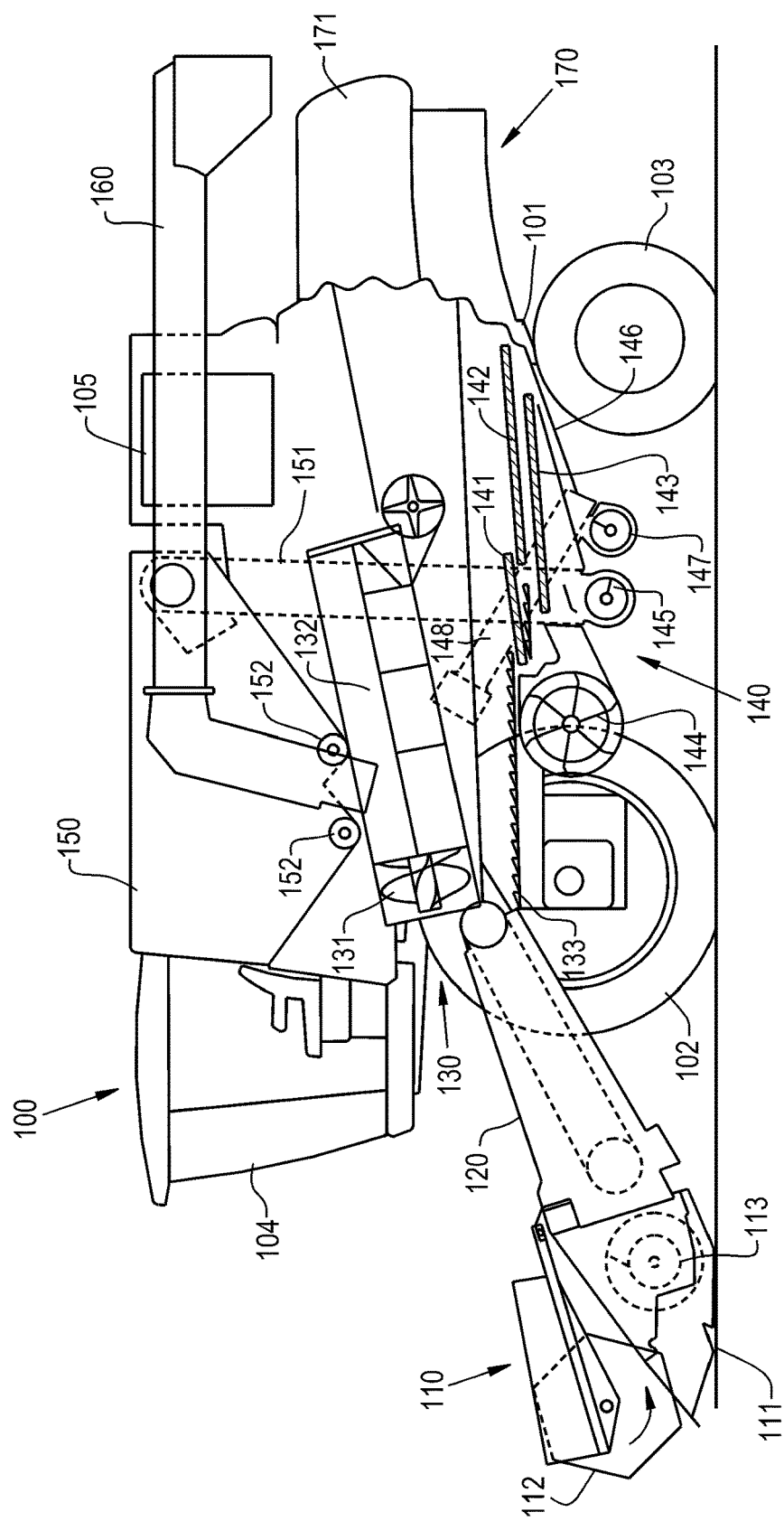
FIG. 1 is a side view of an agricultural vehicle formed in accordance with an exemplary embodiment of the present invention.

Referring now to the drawings, and more particularly to FIG. 1, there is shown a prior art embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage (shown in FIG. 2) and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
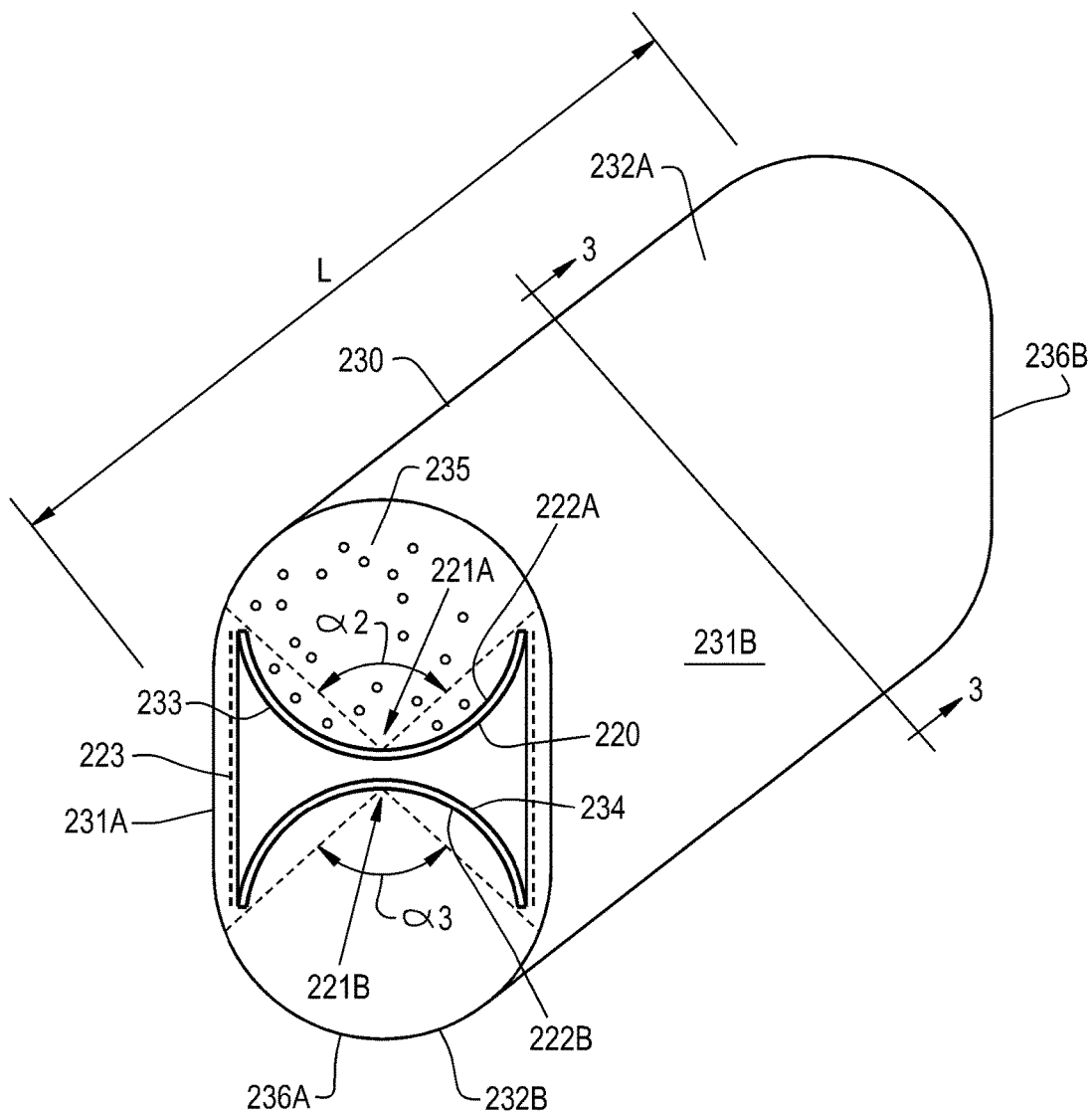
FIG. 2 is a perspective view of an exemplary embodiment of an unloader formed in accordance with the present invention.
Figure 3:
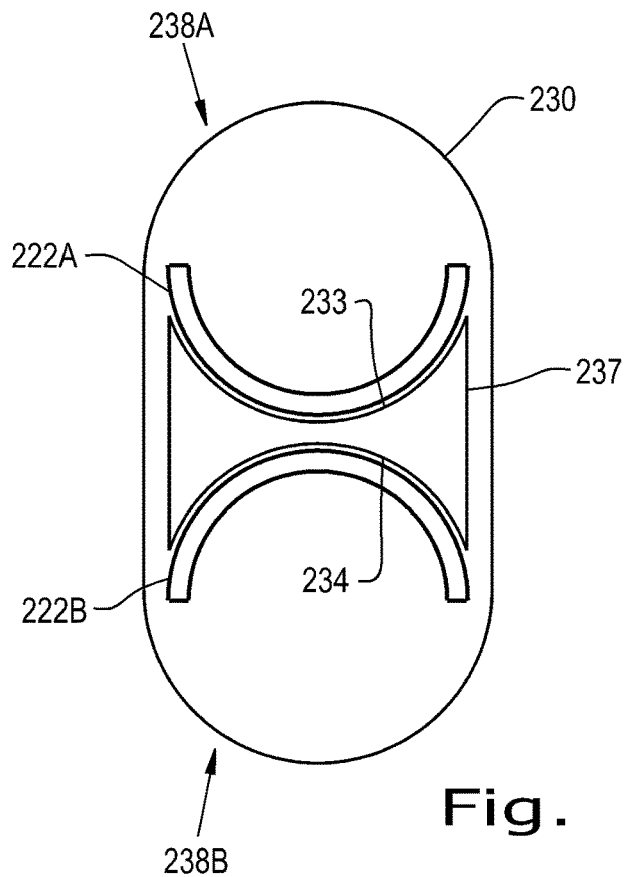
FIG. 3 is a cross-sectional view of the unloader shown in FIG. 2, taken along line 3-3.
Figure 4:
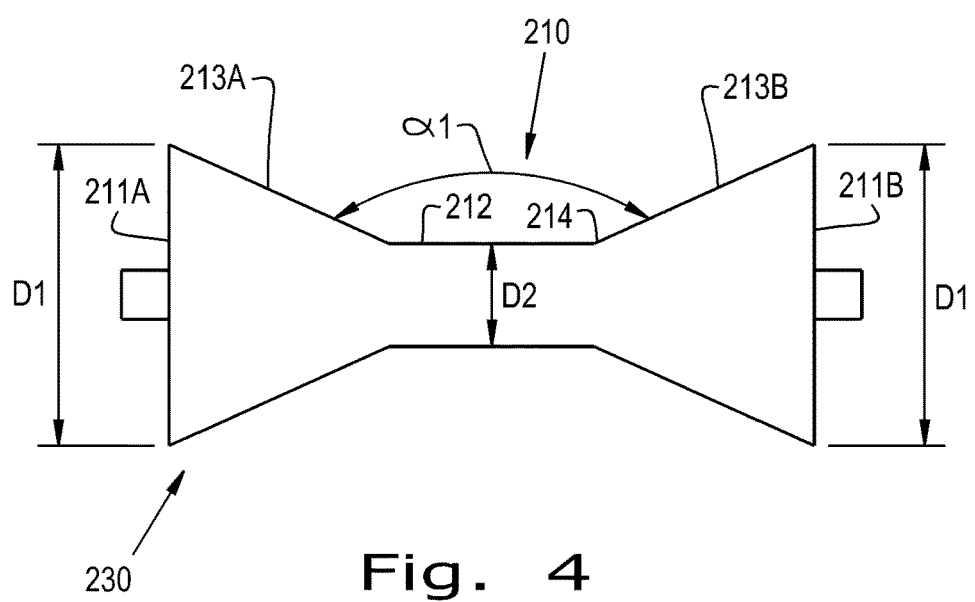
FIG. 4 is a top view of an exemplary embodiment of a roller incorporated in the unloader shown in FIG. 2.

Referring now to FIGS. 2-4, an exemplary embodiment of the unloader 160, which can also be referred to as a material conveyor, formed according to present invention is shown and generally includes a roller 210 (shown in FIG. 4), a belt 220 wrapped around the roller 210, and an oblong housing 230 partially enclosing the belt 220. The roller 210 can be mechanically coupled to a rotating element (not shown) of the combine 100, such as a shaft, in order to rotate and drive the belt 220 so that the unloader 160 defines an endless conveyor. Many different types of such rotating elements and mechanical couplings are known, so further discussion of how the roller 210 can be driven by another coupled element is omitted for brevity. The belt 220 can be any type of belt suitable for conveying material as the roller 210 rotates, with the belt 220 being wrapped around the roller 210 such that rotation of the roller 210 causes rotation of the belt 220 through the oblong housing 230. For reasons which are further described herein, the belt 220 can be sufficiently flexible to allow curving of the belt 220 as the roller 210 rotates.

As can be seen, the oblong housing 230 has a pair of generally straight surfaces 231A, 231B connected to each other by a pair of curved surfaces 232A, 232B to define the oblong shape of the housing 230. The oblong housing 230 can have a pair of U-shaped surfaces 233, 234 within an interior 235 of the oblong housing 230 so that the belt 220 is curved by the U-shaped surfaces 233, 234 as the belt 220 travels through the oblong housing 230 during rotation of the roller 210. As shown, the U-shaped surfaces 233, 234 can be similarly shaped but flipped about a dividing surface, described further herein. Due to the belt 220 conforming to the curvature of the U-shaped surfaces 233, 234 during travel through the oblong housing 230, the belt 220 can define a pair of cup-shaped regions 221A, 221B on opposite sides 222A, 222B of the belt 220 when contacting the U-shaped surfaces 233, 234 within the oblong housing 230.

As gravity will force conveyed material, such as grain or other crop material, downward, the top side 222A of the belt 220 can define a conveying side which will convey crop material during rotation of the roller 210 while the bottom side 222B of the belt 220 can define a return side which will return toward the roller 210 after reaching a longitudinal end 236A, 236B of the oblong housing 230. The belt 220 can also define a pair of flattened regions 223 between the first U-shaped surface 233 and the second U-shaped surface 234, i.e., adjacent to the longitudinal ends 236A, 236B of the oblong housing 230, during rotation of the roller 210. In this sense, the belt 220 undergoes two shape changes adjacent to the longitudinal ends 236A, 236B of the oblong housing 230: the first shape change occurring as the belt 220 comes out of contact with one of the U-shaped surfaces 233, 234 to flatten into one of the flattened regions 223; and the second shape change occurring when the flattened region 223 of the belt 220 comes back into contact with one of the U-shaped surfaces 233, 234 to conform to the shape and curve. The cup-shape of the belt 220 on the conveying side 222A helps to hold a deeper amount of crop material, increasing the volume that can be carried. The change in the shape of the belt 220 that occurs adjacent to the longitudinal ends 236A, 236B of the oblong housing 230, on the other hand, helps to loosen material particles that may get stuck in the belt 220 during operation, serving as a self-cleaning mechanism of the belt 220 during operation. Material that falls off the belt 220 from the self-cleaning action can then travel back toward the unloader 160 and be transported again by the belt 220. Due to the self-cleaning action that occurs from the belt 220 changing shape, the belt 220 can have less material, such as grain, accumulate on and/or in the belt 220 during operation, reducing grain loss within the agricultural vehicle 100 while also reducing the possibility of accumulated material adversely affecting operation of the belt 220.

Referring specifically now to FIG. 3, it can be seen that the oblong housing 230 can include a divider 237 within the oblong housing 230 that divides the oblong housing 230 into a top half 238A which encloses the conveying side 222A of the belt 220 and a bottom half 238B which encloses the return side 222B of the belt 220. The divider 237 can be integrally formed in the oblong housing 230 or be a separable piece that joins the top half 238A and bottom half 238B together. As shown, the U-shaped surfaces 233, 234 of the oblong housing 230 can be included as part of the divider 237, with the divider 237 generally defining an hourglass shape. The divider 237 can extend along an entire length L of the oblong housing 230, as shown, or, alternatively, can be one or more dividers extending along only a portion of the length L. It should therefore be appreciated that the U-shaped surfaces 233, 234, if included, do not need to extend along the entire length L of the oblong housing 230, so long as the U-shaped surfaces 233, 234 are able to curve the belt 220 during rotation of the roller 210.

Referring now to FIG. 4, an exemplary embodiment of the roller 210 formed in accordance with the present invention is shown. As can be seen, the roller 210 can have a generally hourglass shape formed by a pair of first diameter regions 211A, 211B defining a first roller diameter D1 connected by a second diameter region 212 defining a second roller diameter D2 which is less than the first roller diameter D1. The roller 210 can also include tapering regions 213A, 213B between the respective first diameter regions 211A, 211B and the second diameter region 212 where the first roller diameters D1 of the first diameter regions 211A, 211B linearly decrease to the second roller diameter D2 of the second diameter region 212. When the roller 210 has such a shape, the roller 210 itself can also cause curving of the belt 220 as the belt 220 contacts and rotates around the roller 210 before entering the oblong housing 230. Such pre-curving of the belt 220 by the roller 210 can allow the belt 220 to gradually curve during rotation of the roller 210 and decrease the stress experienced by the belt 220 during curving, increasing the longevity of the belt 220 and reducing the frequency with which the belt 220 will need to be replaced. It should therefore be appreciated that a surface 214 of the roller 210 which contacts the belt 220 during rotation can approximately define a U-shape, which also may be referred to as an arc, with a roller degree of curvature $\alpha 1$ which is greater than a respective housing degree of curvature $\alpha 2$, $\alpha 3$ of the U-shaped surfaces (arcs) 233, 234 of the oblong housing 230.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural vehicle, comprising:
a chassis;
a cleaning system carried by said chassis including at least one sieve and configured to clean crop material; and
an unloader carried by said chassis and supplied with cleaned crop material from said cleaning system, said unloader including:
a roller;
a belt wrapped around said roller and defining a conveying side and a return side opposite said conveying side; and an oblong housing at least partially enclosing said belt, said oblong housing comprising a first U-shaped surface in contact with said conveying side of said belt and a second U-shaped surface in contact with said return side of said belt.

2. The agricultural vehicle according to claim 1, wherein said belt defines a flattened region between said first U-shaped surface and said second U-shaped surface during rotation of said roller.

3. The agricultural vehicle according to claim 1, wherein said oblong housing includes a divider including at least one of said first U-shaped surface and said second U-shaped surface.

4. The agricultural vehicle according to claim 1, wherein said roller comprises a first diameter region defining a first roller diameter and a second diameter region connected to said first diameter region and defining a second roller diameter which is less than said first roller diameter.

5. The agricultural vehicle according to claim 4, wherein said roller defines a tapering region between said first diameter region and said second diameter region, said first roller diameter linearly decreasing in said tapering region to said second roller diameter.

6. The agricultural vehicle according to claim 4, wherein said roller defines a generally hourglass shape formed by a pair of first diameter regions connected by said second diameter region.

7. The agricultural vehicle according to claim 4, wherein said roller includes a surface approximately defining a U-shape and defining a roller degree of curvature which is greater than a housing degree of curvature of at least one of said first U-shaped surface and said second U-shaped surface of said oblong housing.

8. A material conveyor, comprising:
a roller;
a belt wrapped around said roller and defining a conveying side and a return side opposite said conveying side; and
an oblong housing at least partially enclosing said belt, said oblong housing comprising a first U-shaped surface in contact with said conveying side of said belt and a second U-shaped surface in contact with said return side of said belt.

9. The material conveyor according to claim 8, wherein said belt defines a flattened region between said first U-shaped surface and said second U-shaped surface during rotation of said roller.

10. The material conveyor according to claim 8, wherein said oblong housing includes a divider including at least one of said first U-shaped surface and said second U-shaped surface.

11. The material conveyor according to claim 8, wherein said roller comprises a first diameter region defining a first roller diameter and a second diameter region connected to said first diameter region and defining a second roller diameter which is less than said first roller diameter.

12. The material conveyor according to claim 11, wherein said roller defines a tapering region between said first diameter region and said second diameter region, said first roller diameter linearly decreasing in said tapering region to said second roller diameter.

13. The material conveyor according to claim 11, wherein said roller defines a generally hourglass shape formed by a pair of first diameter regions connected by said second diameter region.

14. The material conveyor according to claim 11, wherein said roller includes a surface approximately defining a U-shape and defining a roller degree of curvature which is greater than a housing degree of curvature of at least one of said first U-shaped surface and said second U-shaped surface of said oblong housing.

15. An agricultural vehicle, comprising:
a chassis;
a cleaning system carried by said chassis including at least one sieve and configured to clean crop material; and
an unloader carried by said chassis and supplied with cleaned crop material from said cleaning system, said unloader including:
a roller;
a belt wrapped around said roller and defining a conveying side and a return side opposite said conveying side; and
a housing at least partially enclosing said belt and having a divider comprising a first U-shaped surface in contact with said conveying side of said belt and a second U-shaped surface in contact with said return side of said belt.

16. The agricultural vehicle according to claim 15, wherein said belt defines a flattened region between said first U-shaped surface and said second U-shaped surface during rotation of said roller.

17. The agricultural vehicle according to claim 15, wherein said roller comprises a first diameter region defining a first roller diameter and a second diameter region connected to said first diameter region and defining a second roller diameter which is less than said first roller diameter.

18. The agricultural vehicle according to claim 15, wherein said first U-shaped surface and said second U-shaped surface are flipped about a dividing surface of said divider.

* * * * *